(12) United States Patent
Bai (10) Patent No.: US 8,055,417 B2
(45) Date of Patent: Nov. 8, 2011

(54) TRANSMISSION GEAR SELECTION AND ENGINE TORQUE CONTROL METHOD AND SYSTEM

(75) Inventor: Shushan Bai, Ann Arbor, MI (US)

(73) Assignee: GM Global Technology Operations LLC

( * ) Notice: Subject to any disclaimer, the term of this patent is extended or adjusted under 35 U.S.C. 154(b) by 602 days.

(21) Appl. No.: 12/254,365

(22) Filed: Oct. 20, 2008

(65) Prior Publication Data

US 2010/0087994 A1 Apr. 8, 2010

Related U.S. Application Data

(60) Provisional application No. 61/103,004, filed on Oct. 6, 2008.

(51) Int. Cl.
B60K 17/00 (2006.01)
(52) U.S. Cl. .......................................... 701/58
(58) Field of Classification Search ............... 701/58
See application file for complete search history.

(56) References Cited

U.S. PATENT DOCUMENTS

| | | | | |
|---|---|---|---|---|
| 3,248,881 A * | 5/1966 | Kobayashi | ................. | 60/435 |
| 5,496,227 A * | 3/1996 | Minowa et al. | ................. | 477/62 |
| 5,620,393 A * | 4/1997 | Minowa et al. | ................. | 477/155 |
| 6,352,490 B1 * | 3/2002 | Makki et al. | ................. | 477/78 |
| 6,356,831 B1 * | 3/2002 | Michelini et al. | ................. | 701/56 |
| 6,503,169 B2 * | 1/2003 | Nakano et al. | ................. | 477/62 |
| 6,751,960 B2 * | 6/2004 | Arimitsu et al. | ................. | 60/706 |
| 7,869,913 B2 * | 1/2011 | Aoyama et al. | ................. | 701/22 |
| 2005/0080538 A1 * | 4/2005 | Hubbard et al. | ................. | 701/54 |
| 2005/0080539 A1 * | 4/2005 | Hubbard et al. | ................. | 701/54 |
| 2005/0209760 A1 * | 9/2005 | Tabata et al. | ................. | 701/53 |
| 2008/0153664 A1 * | 6/2008 | Tabata et al. | ................. | 477/37 |
| 2008/0306665 A1 * | 12/2008 | Wheals | ................. | 701/59 |
| 2009/0118952 A1 * | 5/2009 | Heap et al. | ................. | 701/56 |

FOREIGN PATENT DOCUMENTS

DE 19532124 A1 3/1996
DE 102006009589 9/2007

* cited by examiner

*Primary Examiner* — Mark Hellner
*Assistant Examiner* — Ari M Diacou (57) ABSTRACT

A method and control system for a transmission in communication with an engine includes a pedal input interpreter module determining a power demand signal from a pedal position and a vehicle speed. The system also includes a real time gear selection module determining an engine speed of each gear in response to the vehicle speed and power demand signal, determining an engine torque of each gear in response to the vehicle speed and power demand signal, determining a transmission component speed of each gear in response to the vehicle speed and power demand signal and determining a gear selection for the transmission from the power demand signal, the engine speed, the engine torque, and the transmission component speed. The system may also use the cost signal of each gear and penalty signal of each gear for determining the gear selection.

20 Claims, 13 Drawing Sheets

TRANSMISSION GEAR SELECTION AND ENGINE TORQUE CONTROL METHOD AND SYSTEM

CROSS-REFERENCE TO RELATED APPLICATIONS

This application claims the benefit of U.S. Provisional Application No. 61/103,004, filed on Oct. 6, 2008. The disclosure of the above application is incorporated herein by reference.

FIELD OF THE INVENTION

The present invention relates to vehicles, and more particularly to determining gear selections in an automatic transmission.

BACKGROUND OF THE INVENTION

Internal combustion (IC) engines generate torque by combusting a fuel and air mixture. The torque provides propulsion force to the wheels through a transmission and other drivetrain components.

Figure 1:
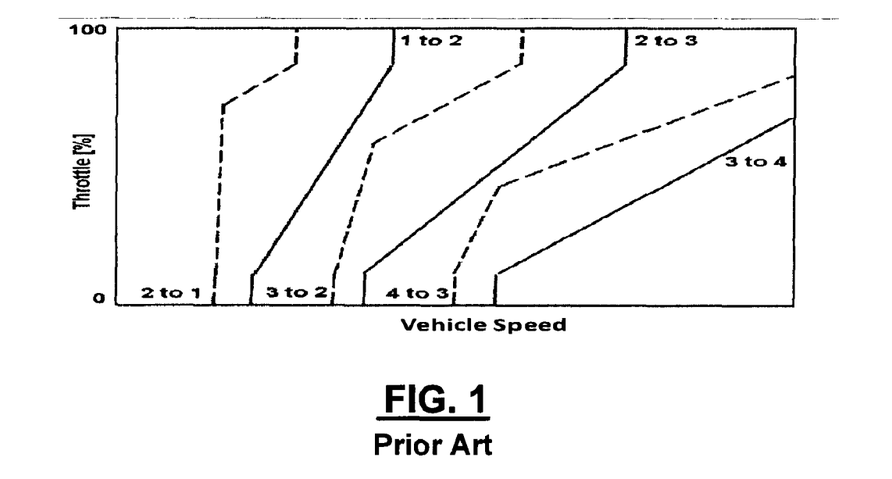
FIG. 1 is a plot of throttle versus vehicle speed illustrating upshifts in solid lines and downshifts in dotted lines.

Referring now to FIG. 1, an automatic transmission uses shift maps to define the points for upshifting and downshifting of the transmission into the various gears. As illustrated in FIG. 1, a typical shift map is illustrated having the solid lines representing up-shifts speed lines and the broken lines illustrating down-shifts speed lines. The up-shift and down-shift lines are based upon the position of the throttle and the vehicle speed. Because the control is limited to only two variables, control is limited. Certain conditions may not be properly accounted for in the shift determination.

SUMMARY OF THE INVENTION

Accordingly, the present invention overcomes limited controllability of shifting based only on throttle and vehicle speed. Various other conditions may be considered in the shifting decision to improve the drivability and fuel economy for the transmission and the associated vehicle.

In one aspect of the disclosure, a method of controlling an automatic transmission of an automotive vehicle includes determining a power demand signal from a pedal position and a vehicle speed, determining an engine speed of each gear in response to the vehicle speed and power demand signal, determining an engine torque of each gear in response to the vehicle speed and power demand signal, determining a transmission component speed of each gear in response to the vehicle speed and power demand signal, and determining a gear selection for the transmission from the power demand signal, the engine speed, the engine torque and the transmission component speed.

In a further aspect of the disclosure, a method of controlling an automatic transmission includes determining a transmission turbine speed for a transmission having gears, determining engine speed in response to the turbine speed and a power demand, determining engine torque in response to the engine speed and the power demand, determining a cost function for each gear in response to the engine speed and engine torque, determining a penalty for each gear in response to engine speed and engine torque, determining a minimal cost gear in response to the cost for each gear and the penalty to each gear and commanding an automatic transmission to select the minimal cost gear.

In yet another aspect of the disclosure, a control system for a transmission in communication with an engine includes a pedal input interpreter module determining a power demand signal from a pedal position and a vehicle speed. The system also includes a real time gear selection module determining an engine speed of each gear in response to the vehicle speed and power demand signal, determining an engine torque of each gear in response to the vehicle speed and power demand signal, determining a transmission component speed of each gear in response to the vehicle speed and power demand signal and determining a gear selection for the transmission from the power demand signal, the engine speed, the engine torque and the transmission component speed. The system also includes an engine torque command generator module determining the engine torque command in response to the power demand and engine speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 2:
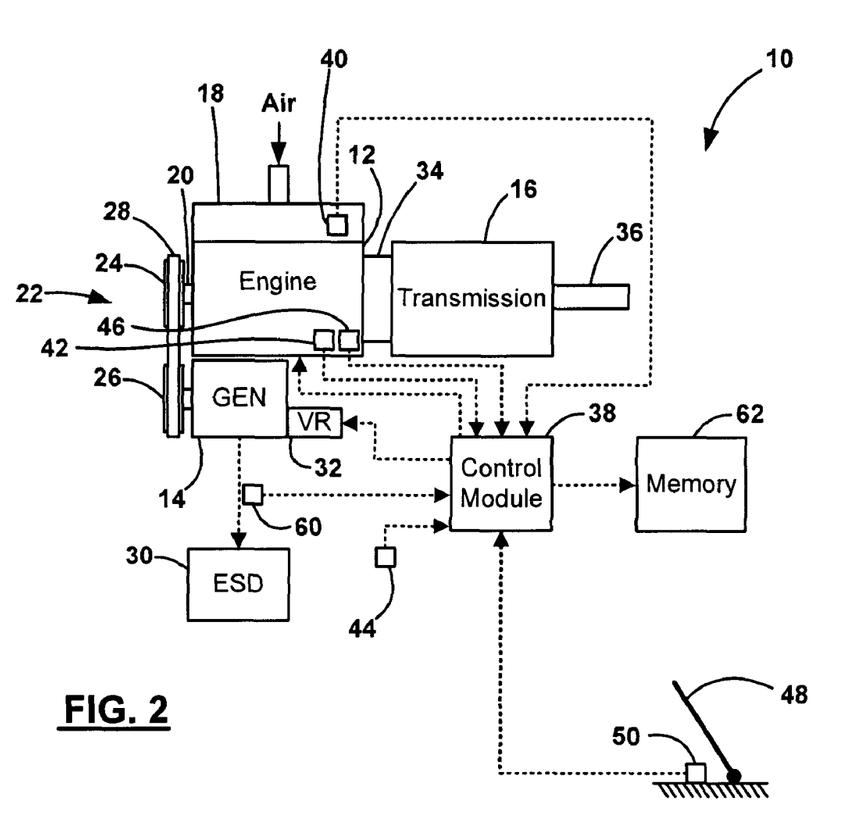
FIG. 2 is a schematic illustration of an exemplary vehicle that is operated based on the generator torque estimation system according to the present invention.

Referring now to FIG. 2, an exemplary vehicle 10 includes an engine 12, a generator 14 and a transmission 16. The engine 12 produces drive torque to drive the generator 14 and the transmission 16. More specifically, the engine 12 draws air into an intake manifold 18 that distributes the air to a cylinder (not shown) where it is combined with fuel to form an air/fuel mixture. The air/fuel mixture is combusted to drive a piston (not shown) within the cylinder, thereby driving a crankshaft 20 to generate drive torque. The combustion process is initiated by a spark generated by a spark plug (not shown). The timing of the spark, relative to the position of the cylinder within the piston, can be adjusted (i.e., retarded or advanced) to regulate exhaust temperature, engine torque and manifold absolute pressure (MAP).

The engine 12 and the alternator 14 are coupled via a belt system 22. The engine 12 and the generator 14 include pulleys 24, 26, respectively, that are coupled for rotation by a belt 28. The pulley 24 is coupled for rotation with the crankshaft 20 of the engine 12. The engine 12 drives the generator 14 to generate power used by vehicle systems and/or to recharge an energy storage device (ESD) 30. The generator 14 includes a variable load on the engine 12 ($T_{GEN}$) that is regulated by a voltage regulator (VR) 32. When more electrical energy is required from the generator 14, the VR 32 increases $T_{GEN}$, thereby increasing the amount of engine work. When less electrical energy is required from the generator 14, the VR 32 decreases $T_{GEN}$, thereby decreasing the amount of engine work.

The transmission 16 can include an automatic transmission and/or an automated manual transmission (AMT). Drive torque is transferred from the engine crankshaft 20 to the transmission 16 through a coupling device 34. The coupling device 34 can include, but is not limited to, a friction clutch or a torque converter depending upon the type of transmission implemented. The transmission 16 multiplies the drive torque through one of a plurality of gear ratios to drive a driveshaft 36.

A control module 38 regulates operation of the vehicle 10 based on the generator torque estimation system of the present invention. The control module 38 controls engine air flow, fuel injection, spark and alternator load to regulate engine torque output. A manifold absolute pressure (MAP) sensor 40 is responsive to the MAP within the intake manifold 18 and generates a MAP signal based thereon. An engine temperature sensor 42 is responsive to an engine temperature and generates an engine temperature signal based thereon. It is anticipated that the engine temperature can be determined from a coolant temperature and/or an oil temperature of the engine 12. An ambient temperature sensor 44 is responsive to an ambient temperature and generates an ambient temperature signal based thereon. It is anticipated that the engine temperature can be further determined based on the ambient temperature. A speed sensor 46 is responsive to the rotational speed (RPM) of the engine 12 and generates a speed signal based thereon. An accelerator pedal 48 is a pedal position sensor 50 is sensitive to a position of the accelerator pedal 48. The pedal position sensor 50 generates a pedal position signal based thereon.

A vehicle speed sensor 60 may also be in communication with the control module 38. The vehicle speed sensor 60 generates a vehicle speed signal that corresponds to the speed of the vehicle.

A memory 62 may also be associated with the control module 38. The memory 62 may store various intermediate calculation values and other values such as constants used in the calculations. For example, wheel parameter, final drive ratio, gear ratio efficiency and look-up tables for the engine fuel rate may all be stored in the memory. The memory may be various types of memory or combinations of memory including volatile memory, non-volatile memory and keep-alive memory.

Figure 3:
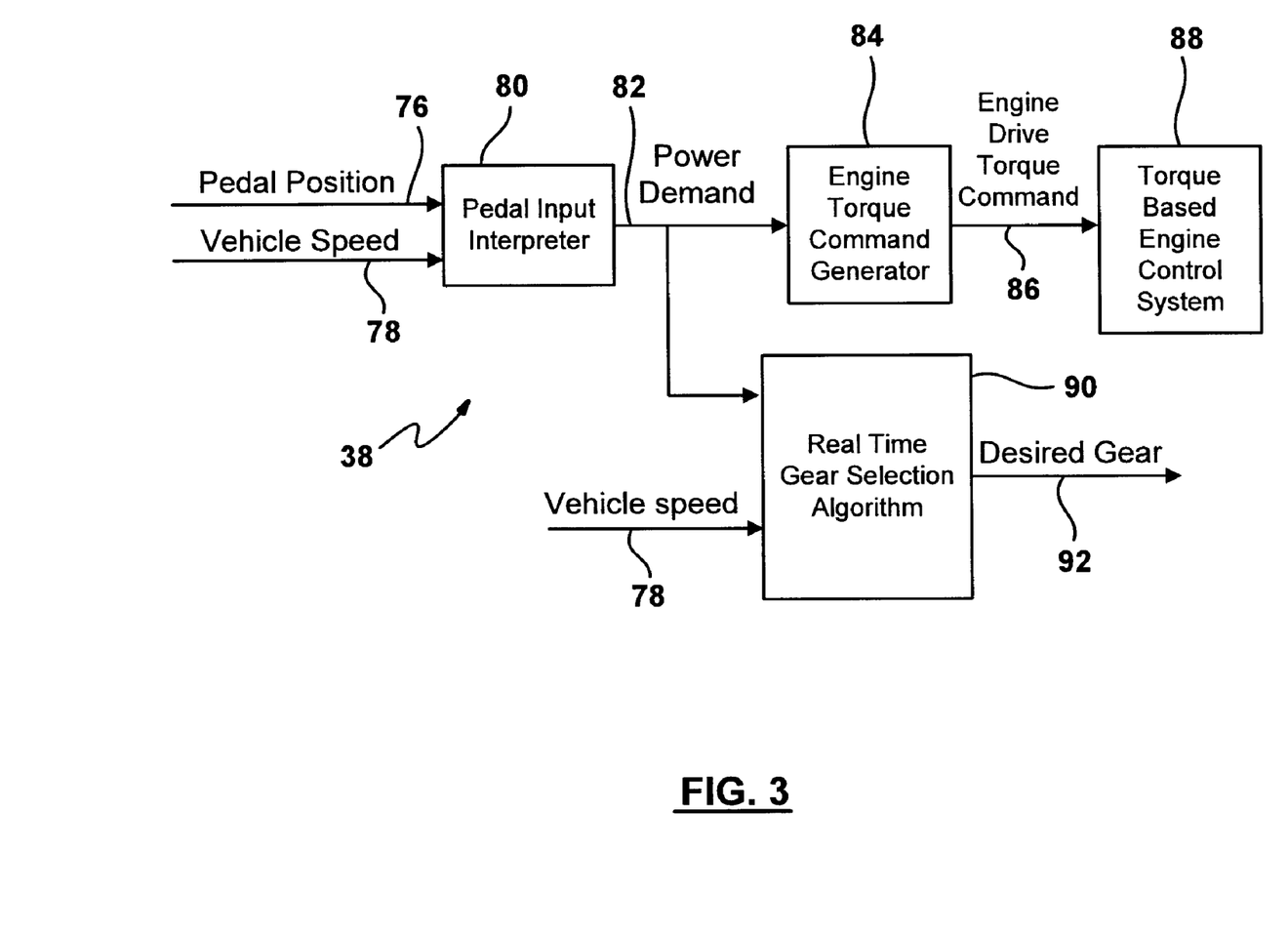
FIG. 3 is a block diagrammatic view of the control module of FIG. 2 for determining real time gear selection.

Referring now to FIG. 3, details within the control module 38 are illustrated. A pedal input interpreter module 80 receives a pedal position signal 76 corresponding to the pedal position from the pedal position sensor 50 and a vehicle speed signal 78 from the vehicle speed sensor 60 illustrated in FIG. 2. Based on the pedal position signal 76 and the vehicle speed signal 78, a power demand signal 82 is generated. The power demand signal 82 is communicated to an engine torque command generator module 84 which, based upon the power demand signal, generates an engine drive torque command 86 that is communicated to a torque-based engine control module 88. In response to the drive torque commanded, the engine is controlled to achieve the power and engine drive torque commanded.

The engine torque command generator 84 generates an engine-driven torque command by simply dividing the power demand with the current engine speed. The torque-based engine control system 88 controls various engine control parameters to deliver the desired engine torque.

Referring back to the pedal input interpreter module 80, the power demand signal 82 generated therefrom is also communicated to a real-time gear selection module 90. The real-time gear selection module 90 receives the power demand signal and a vehicle speed signal and generates a desired gear signal 92 that is communicated to the transmission 16 of FIG. 2 or a control module associated therewith. The transmission gear is selected based upon the desired gear signal 92.

Figure 4:
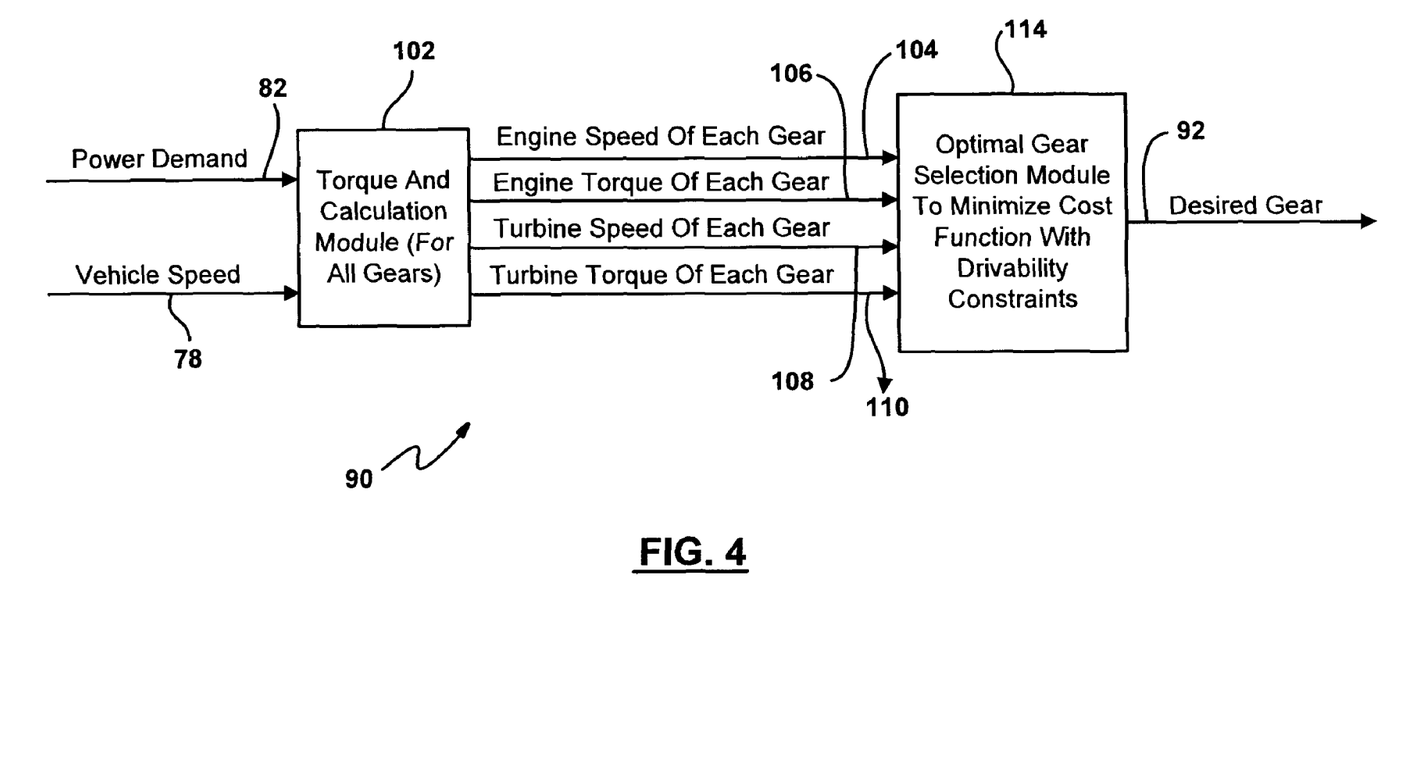
FIG. 4 is a block diagrammatic view of the real time gear selection module of FIG. 3.

Referring now to FIG. 4, the real time gear selection module 90 of FIG. 3 is illustrated in further detail. The real time gear selection module 90 includes a torque and speed calculator module 102 for calculating the torque and speed for all the gears in the associated transmission 16. The torque and speed calculator module calculates an engine speed signal 104 for each gear. The torque and speed calculator module 102 also calculates an engine torque signal 106 for each gear. The torque and speed calculator module 102 also calculates a turbine speed signal 108 for each gear. The torque and speed calculator module 102 also calculates a turbine torque signal 110 for each gear of the transmission. The speed and torque signals 104-110 are communicated to an optimal gear selection module 114 that is used to select a transmission gear ratio which minimizes the cost function defined later within drivability constraints. The operation of this module will be further described below. The output of the optimal gear selection module 114 is desired gear signal 92.

Figure 5:
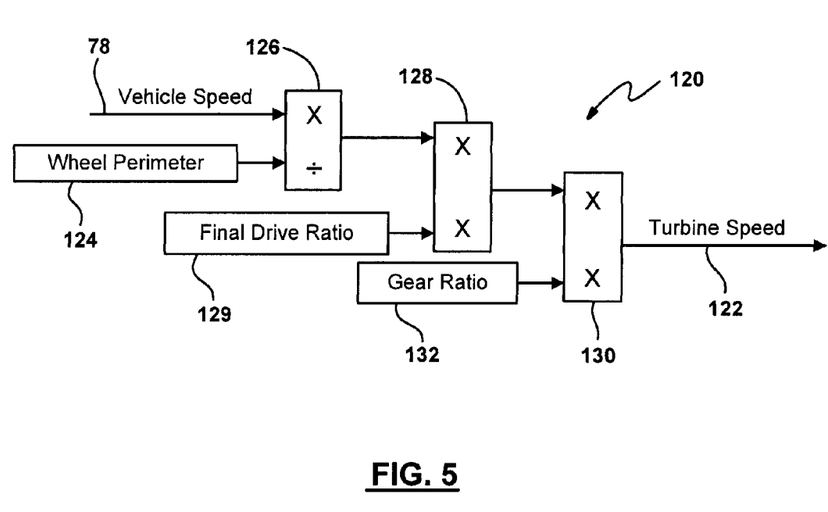
FIG. 5 is a block diagrammatic view of a turbine speed determination module within the torque and speed calculator 102 of FIG. 4.

Referring now to FIG. 5, the torque and speed calculator 102 of FIG. 4 include a turbine speed calculator 120. The turbine speed calculator 120 generates a turbine speed signal 122 for each gear. The transmission includes a torque converter that has a turbine and pump for coupling the engine and transmission. The vehicle speed signal 78 and the wheel parameter 124 of the wheels are provided to a dividing block 126. The wheel perimeter 124 may be a constant stored in the memory 62 of FIG. 2. The vehicle speed divided by the wheel perimeter gives the rotational speed at the wheel. A multiplier block 128 multiplies the rotational speed times the final drive ratio which in turn is multiplied at a multiplier block 130 by the gear ratio 132 to provide a turbine. The wheel parameter 124, the final drive ratio 129 and the gear ratio 132 are all constants that may be stored within the memory 62 associated with the control module or stored within the control module.

Figure 6:
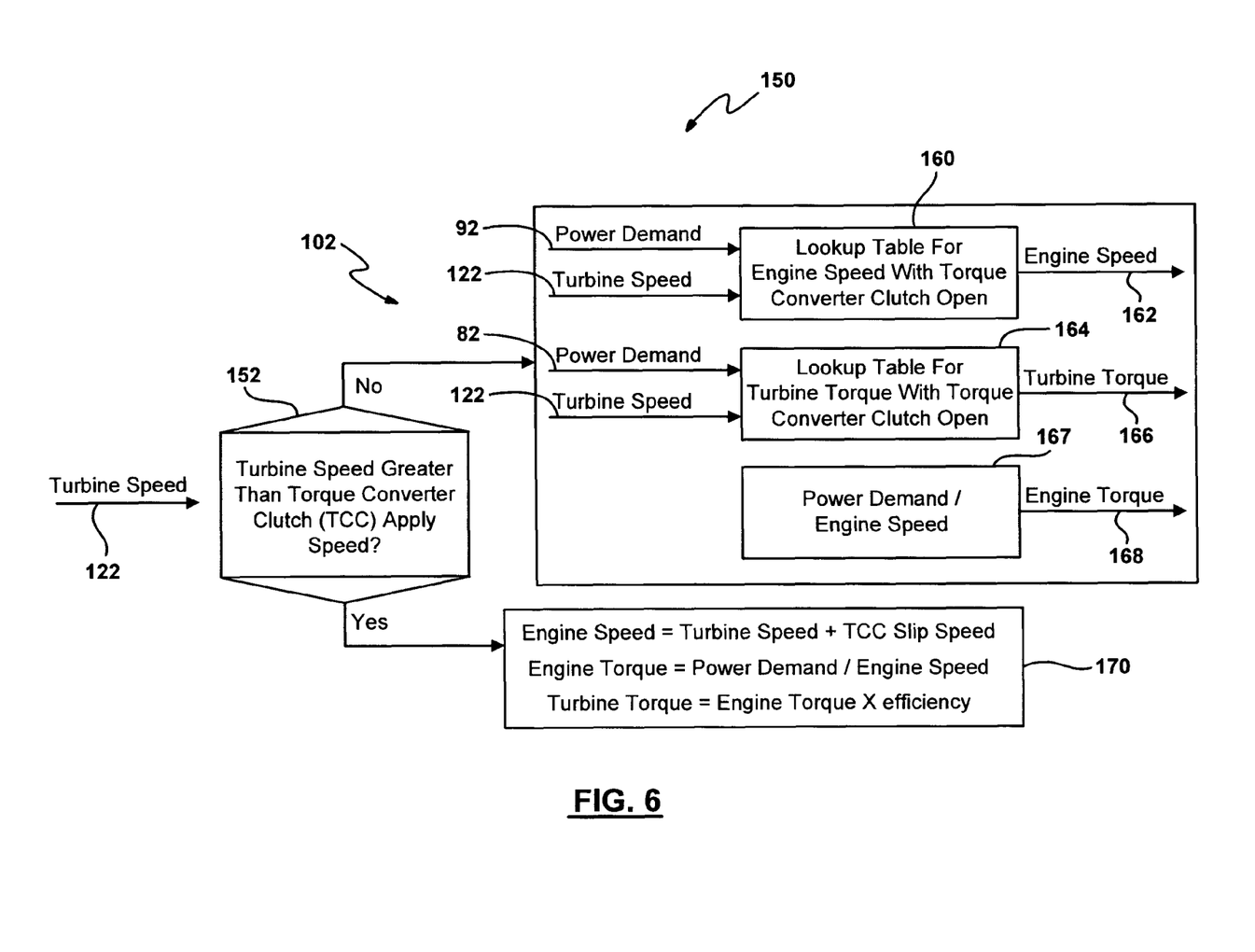
FIG. 6 is a block diagrammatic view of a portion of the torque and speed calculator of FIG. 4.

Referring now to FIG. 6, the torque and speed calculator module 102 may then calculate the engine speed, turbine torque and engine torque in an engine speed and torque and turbine torque calculator module 150. The module 150 may include a decision block 152 that compares the turbine speed 122 to that of a torque converter clutch. When the turbine speed is not greater than the torque converter clutch apply speed, the power demand signal 82 and the turbine speed signal 122 are provided to a look-up table 160 for looking up the engine speed based upon the torque converter clutch being open. The engine speed 162 is output from the table 160. Also, the power demand signal 82 and the turbine speed signal 122 are provided to another look-up table 164 for determining the turbine torque with the converter clutch open. The look-up table 164 uses the power demand signal 82 and the turbine speed 122 to determine a turbine torque signal 166. Also, the power demand signal divided by the engine speed signal in box 167 determines an engine torque signal 168.

When the turbine speed is greater than the torque converter clutch apply speed in box 152, the engine speed is determined as the turbine speed plus the torque converter slip speed, the engine torque is determined as the power demand divided by the engine speed and the turbine torque is determined by the engine torque multiplied by the efficiency in block 170. Ultimately the engine speed signal 162, turbine torque signal 166 and the engine torque are provided from the torque and speed calculator to the optimal gear selection module 114.

Figure 7:
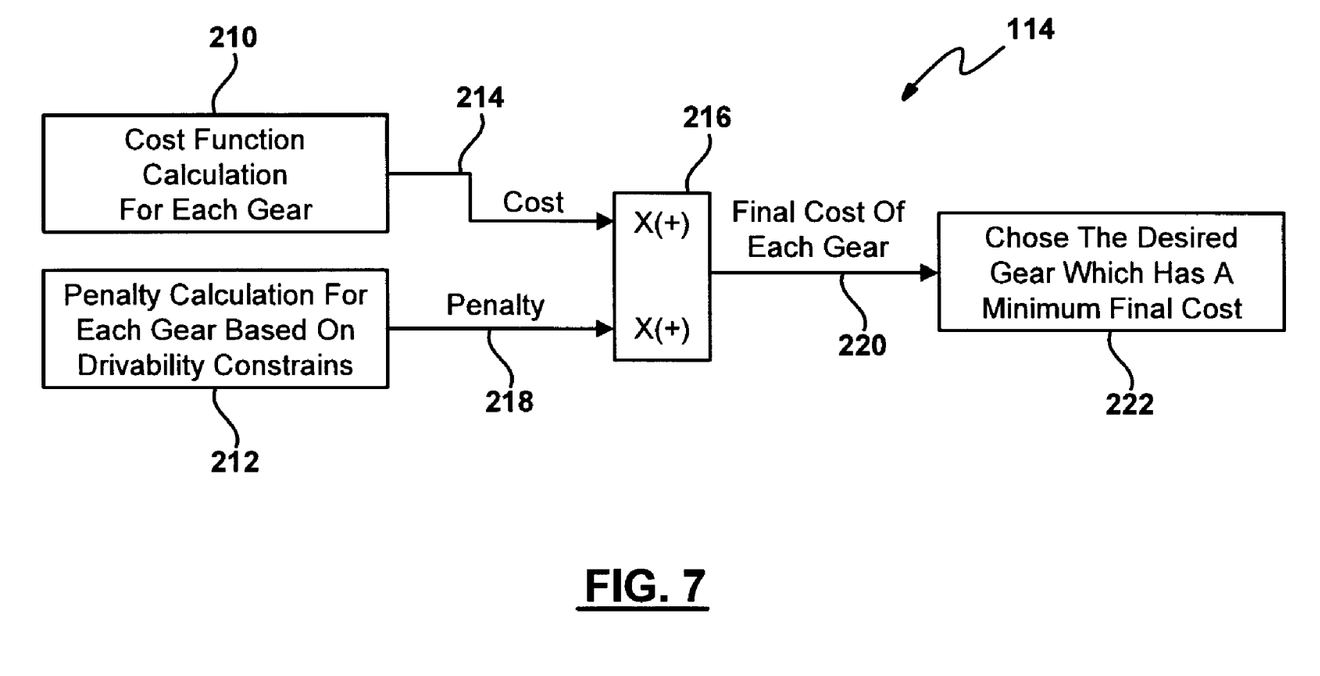
FIG. 7 is a block diagrammatic view of the optimal gear selection module of FIG. 4.

Referring now to FIG. 7, the optimal gear selection module 114 is illustrated in further detail. In general, a cost function calculation is performed for each gear of the transmission in block 210. A penalty calculation module 212 calculates a penalty for each gear based on drivability constraints. The cost function module 210 generates a cost signal 214 and provides it to an arithmetic block 216. The penalty calculation module 212 generates a penalty signal 218 and provides it to the arithmetic calculation block 216. The arithmetic calculation block 216 may multiply, divide, add or subtract the cost signal and penalty signal and ultimately determines a final cost for each gear. A final cost signal 220 is provided to a comparison module or determination module 222 that determines the desired gear that has the minimal final cost by comparing the final cost associated with each gear. Ultimately the transmission is switched to the gear that has the minimum final cost in response to block 222.

Figure 8:
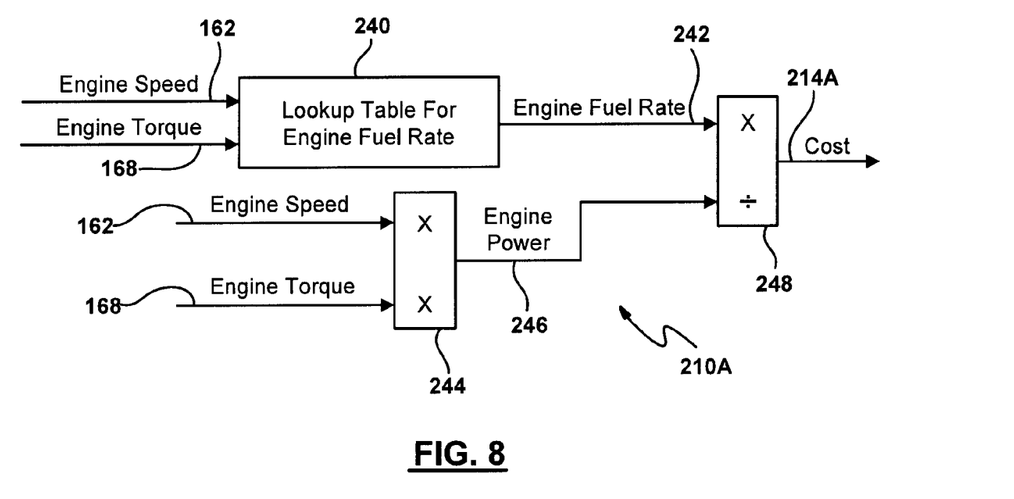
FIG. 8 is a block diagrammatic view of a first embodiment of a cost determination module.

Referring now to FIG. 8, a first embodiment of a cost function 210A is illustrated. It should be noted that each of the cost functions are performed for each of the gears in the transmission. In the first cost function, a look-up table 240 uses the engine speed signal 162 and the engine torque signal 168 to generate an engine fuel rate signal 242. The engine speed 162 and the engine torque 168 are also multiplied together in an arithmetic block 244. The engine speed multiplied by the engine torque is used to obtain the engine power signal 246. The fuel rate divided by the engine power is used to obtain the cost signal 214A for each gear. Thus, in this case, the engine speed and the engine torque are ultimately used in the cost signal 214A.

Figure 9:
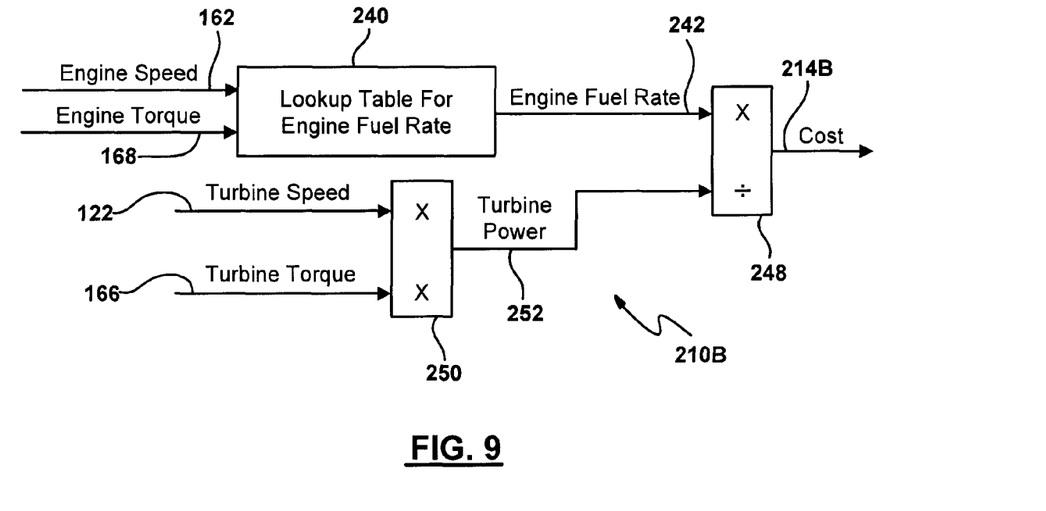
FIG. 9 is a block diagrammatic view of a second embodiment of a cost determination module.

Referring now to FIG. 9, a second cost function 210B is illustrated. In this example, the look-up table 240 uses the engine speed signal 162 and the engine torque signal 168 to determine the engine fuel rate signal 242 as in FIG. 8. However, in this example, the turbine speed signal 122 and the turbine torque signal 166 are provided to a multiplier block 250 to obtain a turbine power signal 252. The engine fuel rate 242 is divided by the turbine power to obtain the cost signal 214B.

Figure 10:
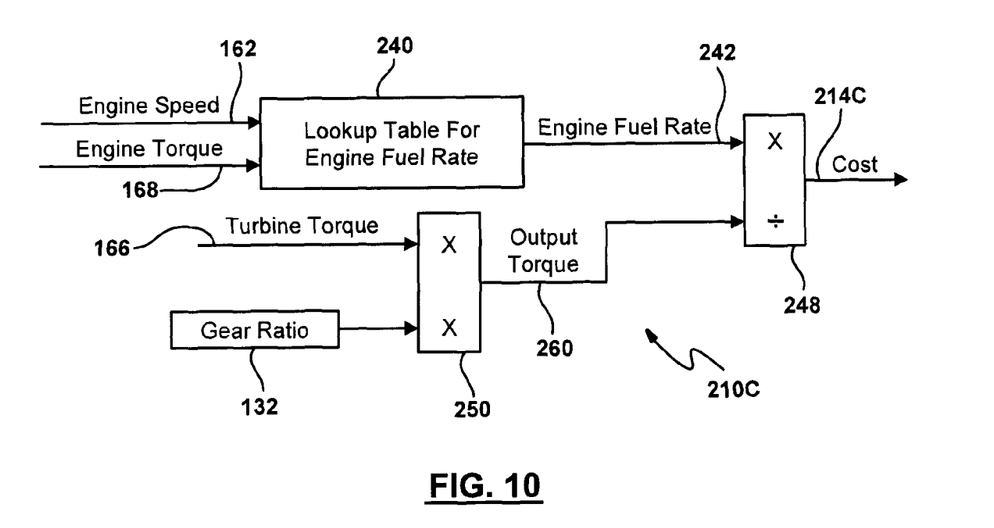
FIG. 10 is a block diagrammatic view of a third embodiment of a cost determination module.

Referring now to FIG. 10, a third embodiment for determining a cost function signal 210C is illustrated. In this example, the engine fuel rate signal 242 is determined in the same way as in FIGS. 8 and 9. In this embodiment, the turbine torque signal 166 is multiplied by the gear ratio 132 to provide a power signal 260. In the arithmetic block 248, the fuel rate is divided by the power signal to obtain the cost signal 214C.

Figure 11:
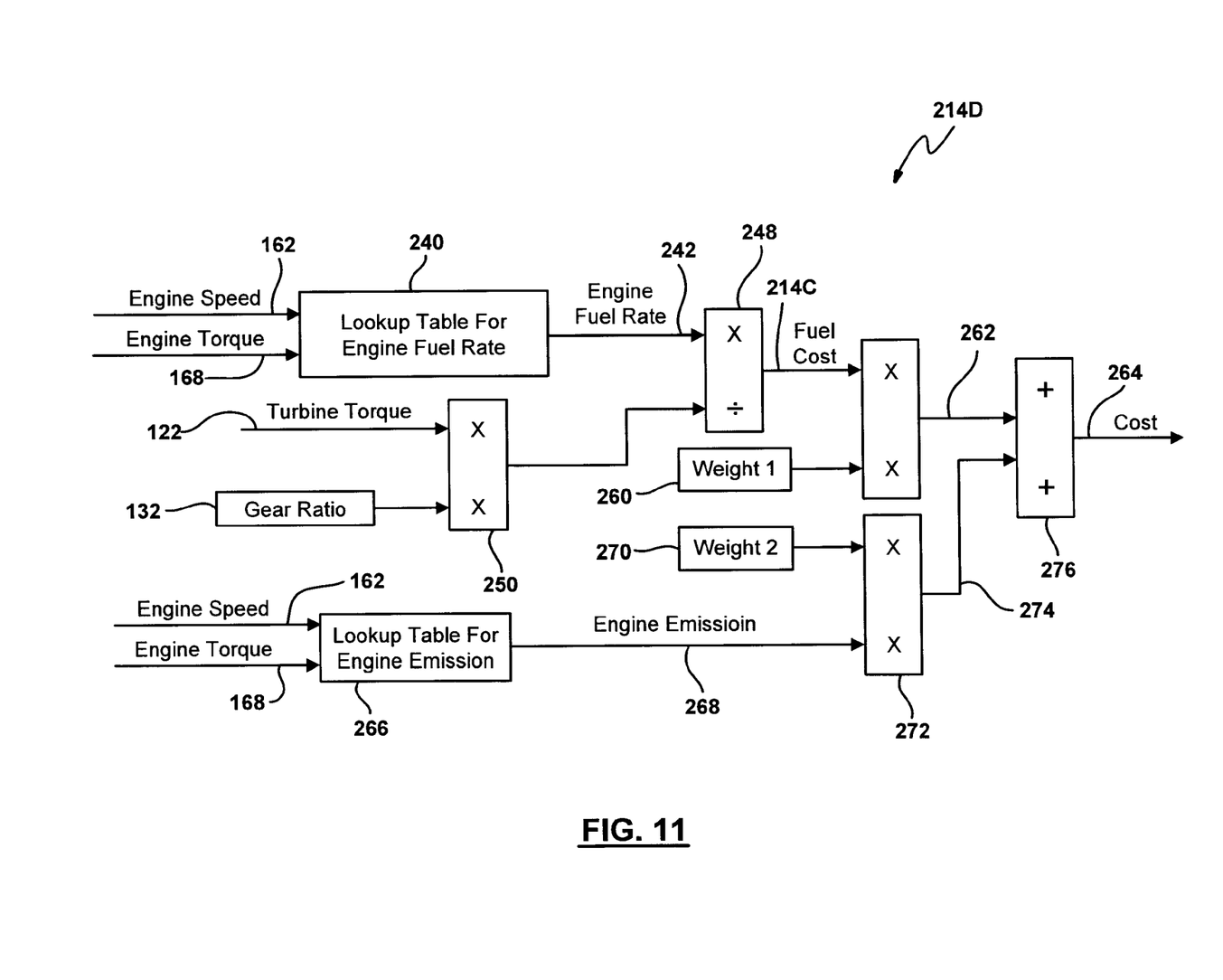
FIG. 11 is a block diagrammatic view of a fourth embodiment of a cost determination module.

Referring now to FIG. 11, a similar embodiment to that of FIG. 10 is illustrated. In this example, the fuel cost signal 214C is generated and multiplied by a first weight 216 to obtain a weighted cost signal 262 which is used to provide an overall cost signal 264.

The overall cost signal 264 also has an emission component thereto. The engine speed signal 162 and engine torque signal 168 are provided to a look-up table 266 to provide an engine emission signal 268 corresponding to the amount of engine emissions provided by the system. The engine emission signal 268 is multiplied by a second weight 270 in the arithmetic block 272. To form a weighted engine emission signal 274. The weighted engine emission signal 274 and the weighted fuel cost signal 262 are added together to form the final cost signal 264 in block 276. This may be performed for each gear. Ultimately, the control module may determine the lowest cost for each gear.

Figure 12:
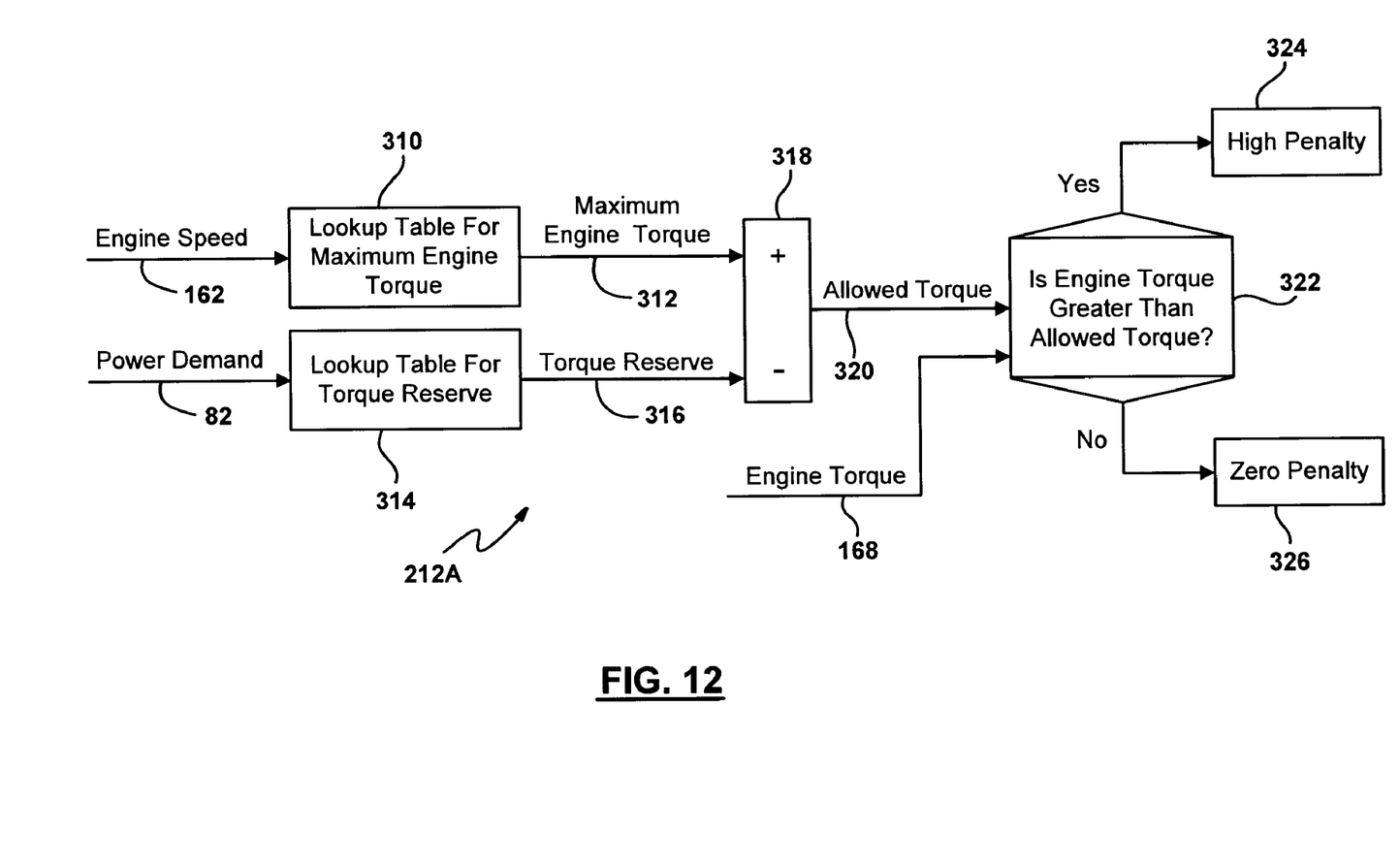
FIG. 12 is a block diagrammatic view of a first embodiment of a penalty determination module.

Referring now to FIG. 12, a penalty determination may be formed for each gear. FIG. 12 illustrates a first embodiment of the penalty calculation of FIG. 7 as 212A. In this embodiment, the engine speed signal 162 is provided to a look-up table 310 to provide a maximum engine torque signal 312. The power demand signal 82 is communicated to a look-up table 314 for determining a torque reserve signal 316. The torque reserve signal 316 is generated from the lookup table and provided to an arithmetic block 318 that combines the torque reserve signal 316 and the maximum engine torque signal 312. The arithmetic block may subtract the torque reserve signal 316 from the maximum engine torque signal 312 to obtain and allow torque signal 320. The allowed torque signal 320 and the engine torque signal 168 are provided to a decision block 322. The decision block determines whether the engine torque is greater than the allowed torque. If the engine torque is greater than the allowed torque, a high penalty is flagged in block 324. In block 322, if the engine torque is not greater than the allowed torque, then there is no penalty in block 326.

Figure 13:
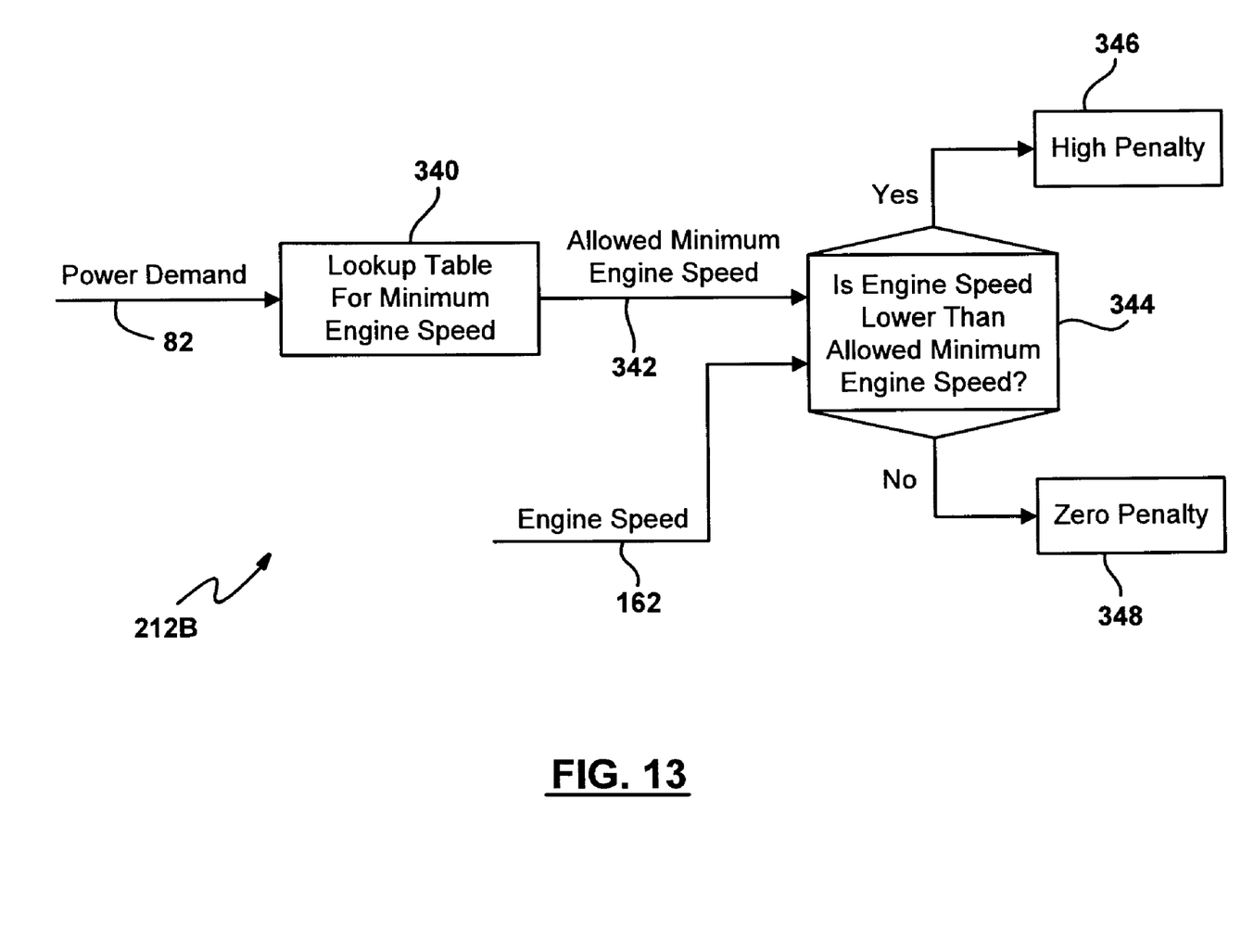
FIG. 13 is a block diagrammatic view of a second embodiment of a penalty determination module.

Referring now to FIG. 13, another embodiment 212B for determining a cost is determined. In this example, the power demand signal 82 is provided to a look-up table 340 for obtaining the allowed minimum engine speed signal 342. The engine speed signal 162 is provided to a decision block 344 for determining whether the engine speed is lower than the allowed engine speed. If the engine speed is lower than the allowed engine speed, a high-penalty flag is activated in 346. If the engine speed is not lower than the allowed engine speed, then there is no penalty and a zero penalty flag is provided in step 348.

Figure 14:
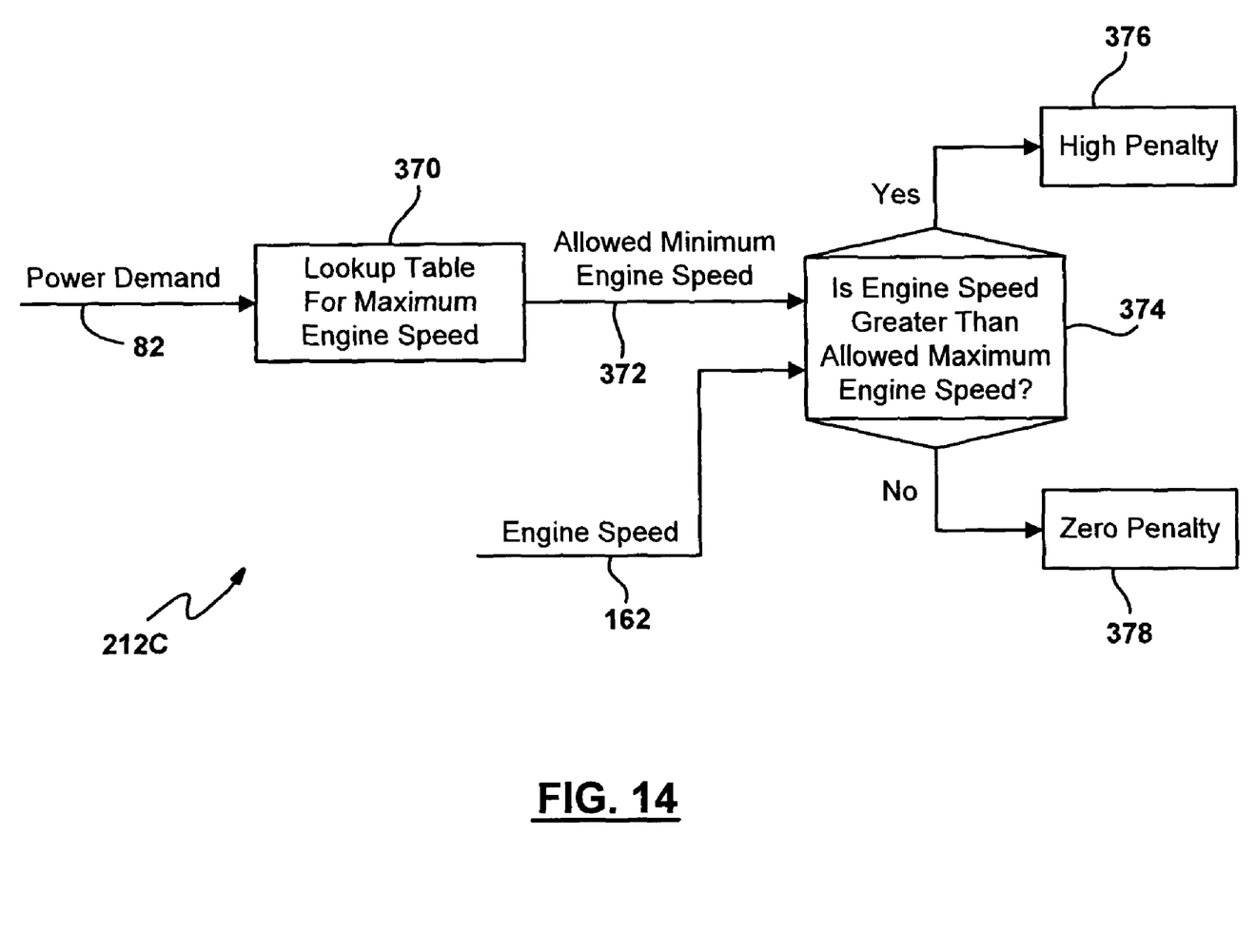
FIG. 14 is a block diagrammatic view of a third embodiment of a penalty determination module.

Referring now to FIG. 14, a third embodiment of a cost signal is determined. In this embodiment, a look-up table 370 that uses the power demand signal 82 to determine an allowed maximum engine speed 372 is provided. The engine speed signal 162 and the allowed maximum engine speed signal 372 are provided to a comparison block 374 that determines whether the engine speed is greater than the allowed maximum engine speed. When the engine speed is greater than the allowed maximum engine speed, block 376 displays a high-penalty flag. If, in block 374, the engine speed is greater than the allowed maximum engine speed, then a no-penalty flag is provided in block 378.

Once the cost and penalty signals are provided, FIG. 7 obtains a final cost of each of the gears. The gear with the minimum final cost is chosen as the desired gear in block 222 of FIG. 7.

It should be noted that the look-up tables above may be easily determined from engine calibration testing. Many of the intermediate calculations are well known look-up table functions.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of selecting a gear in a transmission of an automotive vehicle comprising:
   determining a power demand signal from a pedal position and a vehicle speed;
   determining an engine speed of each gear in response to the vehicle speed and power demand signal;
   determining an engine torque of each gear in response to the vehicle speed and power demand signal;
   determining a transmission component speed of each gear in response to the vehicle speed and power demand signal; and
   determining a gear selection for the transmission from the power demand signal, the engine speed, the engine torque and the transmission component speed.

2. A method as recited in claim 1 further comprising determining a transmission component torque of each gear in response to the vehicle speed and power demand signal and wherein determining a gear selection for the transmission from the power demand signal, the engine speed, the engine torque and the transmission component speed comprises determining the gear selection for the transmission from the power demand signal, the engine speed, the engine torque, the transmission component speed and the transmission component torque.

3. A method as recited in claim 1 further comprising determining an engine fuel rate from the engine speed and the engine torque and wherein determining a gear selection for the transmission from the power demand signal, the engine speed, the engine torque and the transmission component speed comprises determining the gear selection for the transmission from the power demand signal, the engine speed, the engine torque, the transmission component speed and the engine fuel rate.

4. A method as recited in claim 3 further comprising determining an emission amount from the engine speed and the engine torque, and wherein determining the gear selection for the transmission from the power demand signal, the engine speed, the engine torque, the transmission component speed and the engine fuel rate comprises determining the gear selection for the transmission from the power demand signal, the engine speed, the engine torque, the transmission component speed, the engine fuel rate and the emission amount.

5. A method as recited in claim 1 wherein determining a gear selection for the transmission from the power demand signal, the engine speed, the engine torque and the transmission component speed comprises determining a gear selection for the transmission from the power demand signal, the engine speed, the engine torque, the transmission component speed, the vehicle speed, wheel perimeter, final drive ratio, and gear ratio.

6. A method as recited in claim 1 wherein determining an engine speed comprises determining the engine speed of each gear in response to the vehicle speed and power demand signal.

7. A method as recited in claim 1 wherein determining an engine speed of each gear comprises determining the engine speed of each gear in response to the vehicle speed, a transmission component speed and power demand signal.

8. A method of controlling an automatic transmission comprising:
   determining a transmission turbine speed for a transmission having gears;
   determining engine speed in response to the turbine speed and a power demand;
   determining engine torque in response to the engine speed and a power demand;
   determining a cost function for each gear in response to the engine speed and engine torque;
   determining a penalty for each gear in response to engine speed and engine torque;
   determining a minimal cost gear in response to the cost for each gear and the penalty to each gear; and
   commanding an automatic transmission to select the minimal cost gear.

9. A method as recited in claim 8 further comprising determining turbine torque in response to the turbine speed or engine torque.

10. A method as recited in claim 9 wherein determining cost function for each gear comprises determining the cost function based on the engine speed, the engine torque, the turbine torque and turbine speed.

11. A method as recited in claim 9 wherein determining cost function for each gear comprises determining the cost function based on the engine speed, the engine torque, an engine fuel rate and turbine torque and a gear ratio.

12. A method as recited in claim 8 wherein determining cost function for each gear comprises determining the cost function based on the engine speed, the engine torque and an engine fuel rate.

13. A method as recited in claim 8 wherein determining a penalty for each gear in response to engine speed comprises determining a penalty for each gear in response to engine speed and a power demand and the engine torque.

14. A method as recited in claim 8 wherein determining a penalty for each gear in response to engine speed comprises determining a penalty for each gear in response to engine speed and a power demand and the engine speed.

15. A method as recited in claim 8 wherein determining a penalty for each gear in response to engine speed comprises determining a penalty for each gear in response to engine speed and a power demand, the engine speed and a maximum engine speed based on the power demand.

16. A method as recited in claim 8 wherein determining a penalty for each gear in response to engine speed comprises determining a penalty for each gear in response to engine speed and a power demand, the engine speed and a minimum engine speed based on the power demand.

17. A control system for a transmission in communication with an engine comprising:
   a pedal input interpreter module determining a power demand signal from a pedal position and a vehicle speed; and
   a real time gear selection module in communication with the pedal input interpreter module and determining an engine speed of each gear in response to the vehicle speed and power demand signal, determining an engine torque of each gear in response to the vehicle speed and power demand signal, determining a transmission component speed of each gear in response to the vehicle speed and power demand signal and determining a gear selection for the transmission from the power demand signal, the engine speed, the engine torque and the transmission component speed.

18. A control system as recited in claim 17 wherein the real time gear selection module comprises a cost function module generating a cost signal in response to the engine speed and the engine torque and a penalty module generating a penalty signal in response to the power demand signal and the engine speed, said real time gear selection module determining the gear selection in response to the cost signal and the penalty signal.

19. A control system as recited in claim 17 wherein the real time gear selection module comprises a cost function module generating a cost signal in response to the engine speed and the engine torque and a penalty module generating a penalty signal in response to the power demand signal, the engine speed and an allowed minimum engine speed or an allowed maximum engine speed, said real time gear selection module determining the gear selection in response to the cost signal and the penalty signal.

20. A control system as recited in claim 17 wherein the real time gear selection module comprises a cost function module generating a cost signal in response to the engine speed, the engine torque, an engine fuel rate and a transmission component speed or a transmission component torque and a penalty module generating a penalty signal in response to the power demand signal and the engine speed, said real time gear selection module determining the gear selection in response to the cost signal and the penalty signal.

* * * * *